Oct. 1, 1929.  A. S. O'NEIL ET AL  1,729,650

PROCESS FOR WATERPROOFING MATERIALS

Filed Oct. 12, 1925

Inventors:
ARTHUR S. O'NEIL AND ALBERT J. HINDRICHS,
By John H Bruninga
Their Attorney.

Patented Oct. 1, 1929

1,729,650

UNITED STATES PATENT OFFICE

ARTHUR S. O'NEIL AND ALBERT J. HINDRICHS, OF ALTON, ILLINOIS, ASSIGNORS TO WESTERN CARTRIDGE COMPANY, OF EAST ALTON, ILLINOIS, A CORPORATION OF DELAWARE

PROCESS FOR WATERPROOFING MATERIALS

Application filed October 12, 1925. Serial No. 62,092.

This invention applies to a process for waterproofing materials and more particularly to the application of waterproofing substance to articles of manufacture such as the paper tubes used in the manufacture of shot shells.

In accordance with previous processes the waterproofing substance was applied to articles by spraying or rolling or rubbing the substance on the previously dried and prepared article. All of these processes are wasteful of materials and usually present difficult mechanical problems. In addition the waterproofing medium must be set or hardened after its application and this is usually done by drying at a high temperature or baking. This latter process is often injurious to the article. In the case of the paper tubes mentioned above the baking renders the paper dry and brittle.

One of the objects of this invention, therefore, is to provide a simple process of waterproofing materials which will avoid injury to or deterioration of the article.

Another object is to provide such a process which will be economical of moisture-proofing material.

Further objects will appear from the following description taken in connection with the accompanying drawing, in which.

Figure 1:
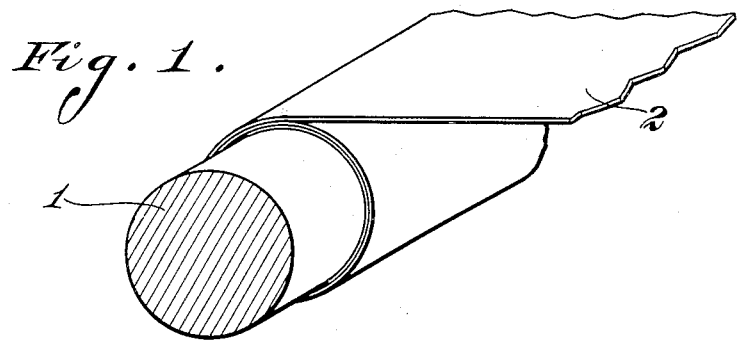
Figure 1 is a diagrammatic view illustrating the manufacture of an article by building up successive layers of material.
Figure 2:
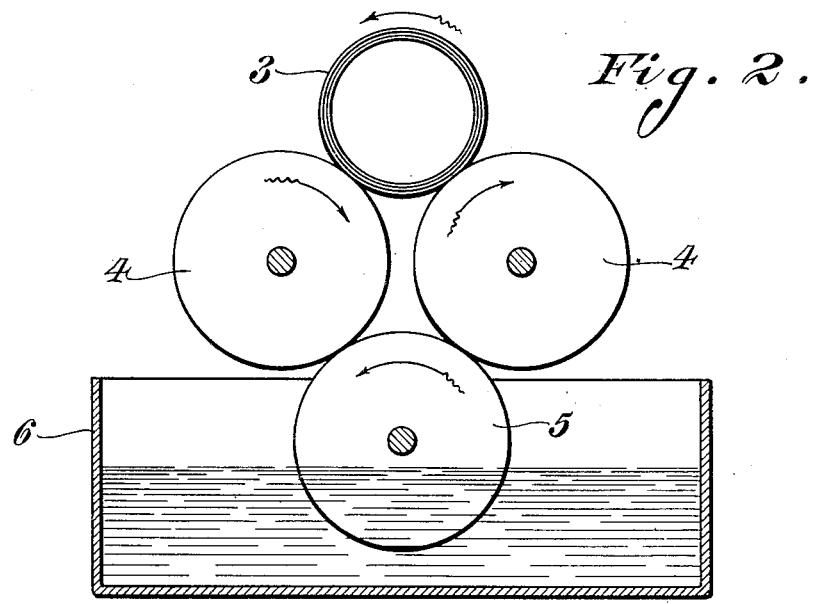
Figure 2 is a diagrammatic view illustrating a method of applying the moisture-proofing substance.
Figure 3:
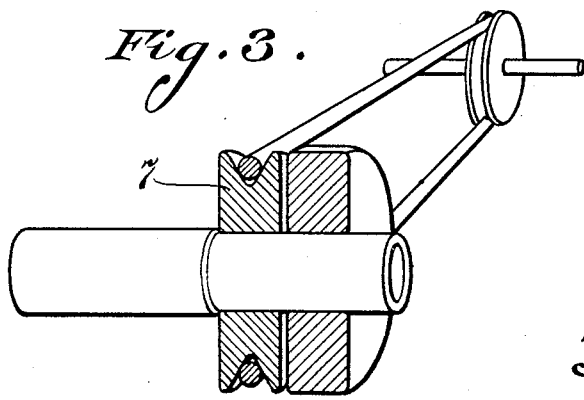
Figure 3 is a diagrammatic view illustrating the operation of ironing the finished article.

In accordance with this invention a simple process for applying the waterproofing medium is provided and one in which a great economy in the expenditure of the waterproofing medium may be realized. The medium employed may be any one of or mixtures of the drying oils, such as tung oil, linseed oil, perilla oil, cotton seed oil etc., or it may be solution of resins or waxes in a satisfactory solvent medium such as turpentine, resin oils, kerosene or carbon tetra-chloride. The preferred mixture consists of tung oil dissolved in from five to thirty percent turpentine, thus forming what is technically termed a varnish. The turpentine is used to assist in the application of a thin uniform film and to hasten the absorption of the oil by the tube and to assist in the subsequent drying.

In accordance with the process of this invention as applied to shot shell tubes, these tubes are rolled on a mandrel 1 on a tube machine and held together by adhesive which as a rule carries a large excess of water, for example—starch paste, glue, dextrine paste, etc. These pastes are usually applied hot to the article which consists of a series of layers of material 2 such as paper which carry moisture, equivalent to the saturation of the atmosphere at the time of application.

When the article is pasted with warm or hot paste the paste does not immediately penetrate the paper but "rides" on the surface. When the manufacture of the article is completed, as when the tube is ejected from the machine, the same begins to cool. During cooling and drying the water from the paste is more or less absorbed by the paper and the contraction on cooling and this absorption of the water from the paste causes a movement of the paste and air from the surface toward the interior of the shell wall. If a film of oil, varnish, nitro-cellulose solution, gum or wax solution is applied previous to this stage, a partial vacuum is formed between the surfaces of the paper and the oil film whereupon, the film being mobile must necessarily flow into the voids in the paper. Advantage of this fact is taken in this improved process. The completely formed article is given a coating, while still warm and moist, of the waterproofing substance. In the case of the shot shell tubes 3 the same on leaving the rolling machine are immediately dropped between a set of rollers 4 revolving in the same direction so as to rotate the tube therebetween. These rollers are supplied with a film of the waterproofing substance by a third roller 5 dipping into a reservoir 6 of the substance. A uniform coating of oil is thus placed upon the article. In the case of the tubes the quantity applied is determined by the number of revolutions of the rollers and the length of time which the paper tube is in contact therewith.

The article is now uniformly coated with the waterproofing medium and upon absorption of the water from the paste and upon contraction due to cooling this medium is drawn in towards the interior of the shell wall, filling the pores of the paper with the waterproofing substance and leaving a thin unbroken film thereof upon the outer surface. Upon subsequent drying to remove the excess moisture the turpentine evaporates and, being a drier, assists in fixing or setting the oxidizing or polymerizing oil on the surface of the article and in the pores of the outside layer of the material thereof.

The next operation consists in ironing the article, this process being carried out in the case of the tubes by means of a revolving die 7 through which the tube is passed. The oil or waterproofing substance has not at this stage become completely oxidized or polymerized and as it is still flexible, any inequalities in the coating are "ironed" out and distributed by the die. In this manner a coat impervious to water is produced on the outside of the article in a simple and economical manner which avoids the waste of waterproofing material and the harmful "baking" operations found in other processes.

It will be seen, therefore, that in accordance with this process the waterproofing substance is applied as a coating to the material and then drawn into the body of the material. The coating is applied while the article is warm and damp and the subsequent cooling and drying of the material has the effect of drawing or forcing the waterproofing substance into the body of the material so as to fill the pores thereof.

It is obvious that various changes may be made in the details without departing from the spirit of this invention; it is to be understood, therefore, that this invention is not to be limited to the specific details shown and described.

Having thus described the invention what is claimed is:

1. In the art of making waterproofed wrapped tubes, the process comprising, applying an absorbable paste to a web of absorbent material, rolling the web into a tube and applying waterproofing material to the surface of the tube before the paste has moved into the absorbent material of the tube, whereby the waterproofing is drawn into the voids of the absorbent material from the surface of the tube.

2. In the art of making waterproofed wrapped tubes, the process comprising, applying an absorbable hot paste to a web of absorbent material, rolling the web into a tube and applying waterproofing material to the surface of the tube before it has cooled and before the paste has moved into the absorbent material of the tube, whereby the waterproofing is drawn into the voids of the absorbent material from the surface of the tube.

In testimony whereof we affix our signatures this 30th day of September, 1925.

ARTHUR S. O'NEIL.
ALBERT J. HINDRICHS.